US010997667B2

(12) United States Patent
Kim et al.

(10) Patent No.: US 10,997,667 B2
(45) Date of Patent: May 4, 2021

(54) METHOD, APPARATUS, AND COMPUTER PROGRAM PRODUCT FOR IDENTIFYING HAZARDOUS CONDITIONS AND PREDICTING POLICY TRANSACTION BEHAVIOR

(71) Applicant: Liberty Mutual Insurance Company, Boston, MA (US)

(72) Inventors: Sung Hoon Kim, Boston, MA (US); Shweta Gadgil, Cambridge, MA (US); Joshua Harvey, Cambridge, MA (US); Lingge Li, Irvine, CA (US)

(73) Assignee: Liberty Mutual Insurance Company, Boston, MA (US)

(*) Notice: Subject to any disclaimer, the term of this patent is extended or adjusted under 35 U.S.C. 154(b) by 46 days.

(21) Appl. No.: 16/125,347

(22) Filed: Sep. 7, 2018

(65) Prior Publication Data

US 2019/0080415 A1 Mar. 14, 2019

Related U.S. Application Data

(60) Provisional application No. 62/556,110, filed on Sep. 8, 2017.

(51) Int. Cl.
*G06Q 40/08* (2012.01)
*G06N 20/00* (2019.01)

(52) U.S. Cl.
CPC ............ *G06Q 40/08* (2013.01); *G06N 20/00* (2019.01)

(58) Field of Classification Search
CPC ...................................................... G06G 40/08
See application file for complete search history.

(56) References Cited

U.S. PATENT DOCUMENTS

| | | | | |
|---|---|---|---|---|
| 7,813,944 | B1 | 10/2010 | Luk et al. | |
| 9,082,015 | B2 | 7/2015 | Christopulos et al. | |
| 10,102,584 | B1 * | 10/2018 | Devereaux | G06Q 10/20 |
| 2009/0265193 | A1 * | 10/2009 | Collins | G06Q 30/0185 705/4 |
| 2015/0039351 | A1 * | 2/2015 | Bell | G06Q 40/08 705/4 |
| 2015/0161738 | A1 | 6/2015 | Stempora | |
| 2016/0171618 | A1 * | 6/2016 | Besman | G06Q 40/08 705/4 |
| 2017/0091871 | A1 | 3/2017 | Trainor et al. | |
| 2018/0089763 | A1 * | 3/2018 | Okazaki | G06K 9/6267 |
| 2018/0336638 | A1 * | 11/2018 | Dziabiak | G06F 7/026 |

* cited by examiner

*Primary Examiner* — Edward Chang
*Assistant Examiner* — William D Newlon
(74) *Attorney, Agent, or Firm* — Alston & Bird LLP

(57) ABSTRACT

Embodiments of the present disclosure provide methods, systems, apparatuses, and computer program products for programmatically predicting policy transactions using machine learning.

19 Claims, 5 Drawing Sheets

METHOD, APPARATUS, AND COMPUTER PROGRAM PRODUCT FOR IDENTIFYING HAZARDOUS CONDITIONS AND PREDICTING POLICY TRANSACTION BEHAVIOR

CROSS-REFERENCE TO RELATED APPLICATIONS

This application claims priority to U.S. Provisional Application Ser. No. 62/556,110, titled "METHOD, APPARATUS, AND COMPUTER PROGRAM PRODUCT FOR IDENTIFYING HAZARDOUS CONDITIONS AND PREDICTING POLICY TRANSACTION BEHAVIOR," and filed Sep. 8, 2017, the contents of which are incorporated herein by reference in their entirety.

BACKGROUND

External physical plots of land and structures have hazards associated with them. Programmatically making decisions to provide policies to insure such external plots and structures can be difficult in view of such hazards. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure relate to concepts for predicting policy transaction behavior. In one embodiment, a computing entity or apparatus is configured to receive, from a remote computing device, a plurality of digital image files associated with the external plot of physical land. In embodiments, each digital image file of the plurality of digital image files is representative of a different field of view of the external plot of physical land. In embodiments, the computing entity or apparatus is further configured to extract, from each digital image file of the plurality of digital image files, one or more image-based plot properties associated with the external plot of physical land. In embodiments, the extracting is performed on a pixel by pixel basis and using a first trained machine learning model. In embodiments, the first trained machine learning model outputs a predicted image-based plot property based on one or more pixels of a digital image file and a confidence measure associated with the predicted image-based plot property. In embodiments, the computing entity or apparatus is further configured to generate, for each image-based plot property and using a second trained machine learning model, a policy transaction prediction. In embodiments, the policy transaction prediction being a programmatically generated likelihood that the image-based plot property will lead to a policy transaction occurrence. In embodiments, the computing entity or apparatus is further configured to, based on the policy transaction predictions, generate an aggregated policy transaction prediction for the external plot of physical land. In embodiments, the aggregated policy transaction prediction being a programmatically generated likelihood that a policy transaction will occur subsequent an insurance policy issuance for the external plot of physical land. In embodiments, the computing entity or apparatus is further configured to transmit, to a requesting computing device, the aggregated policy transaction prediction.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
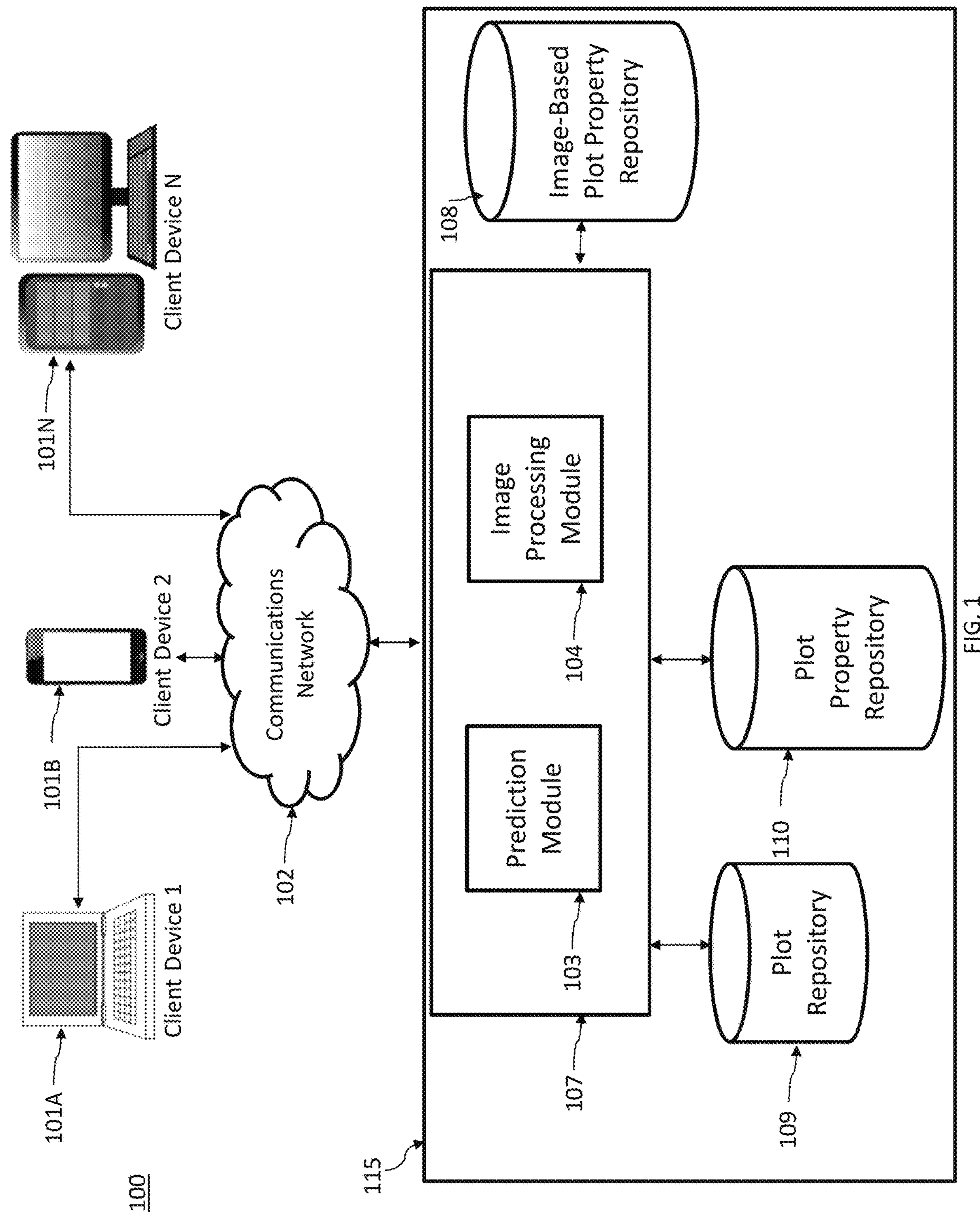
Figure 2:
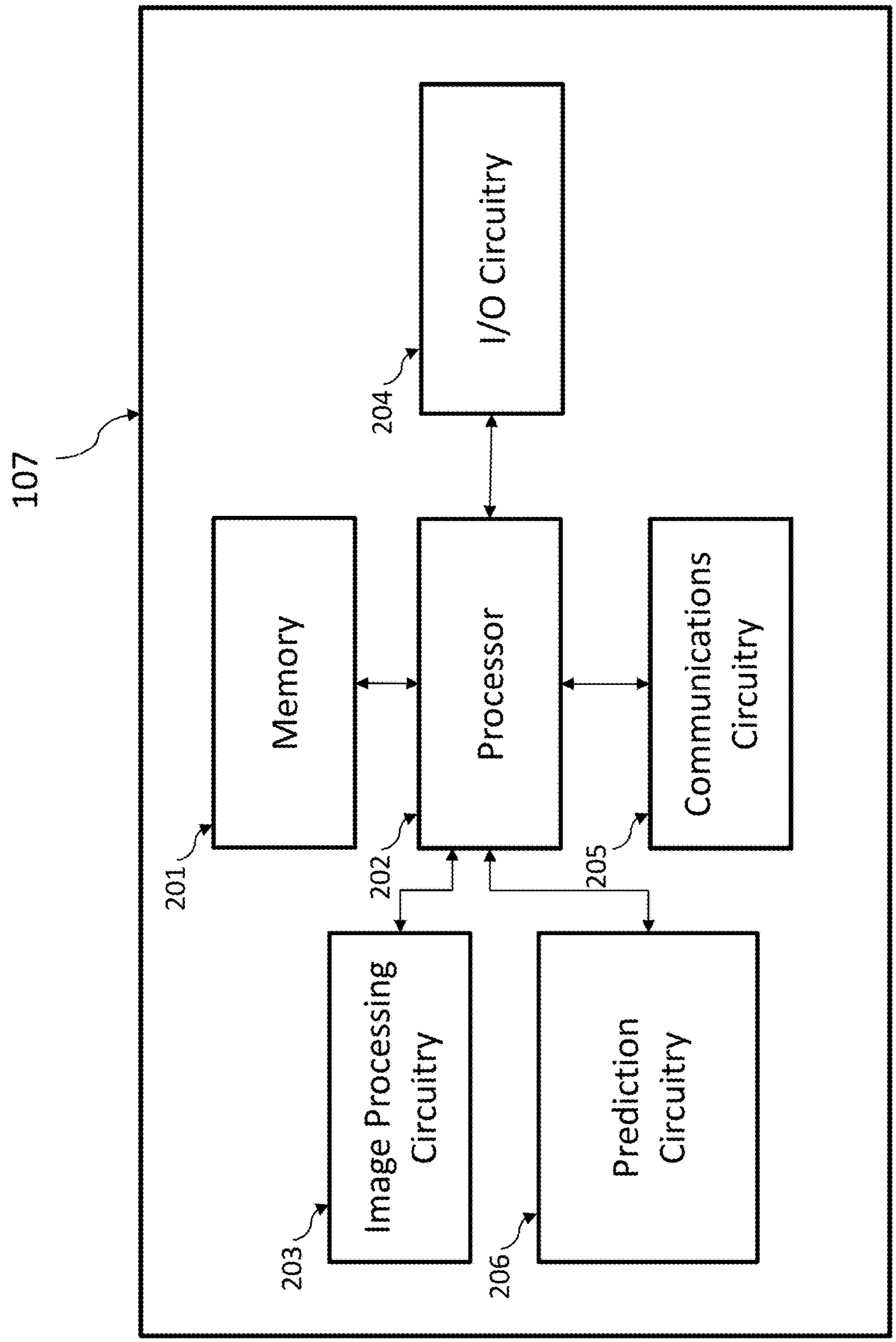
Figure 3:
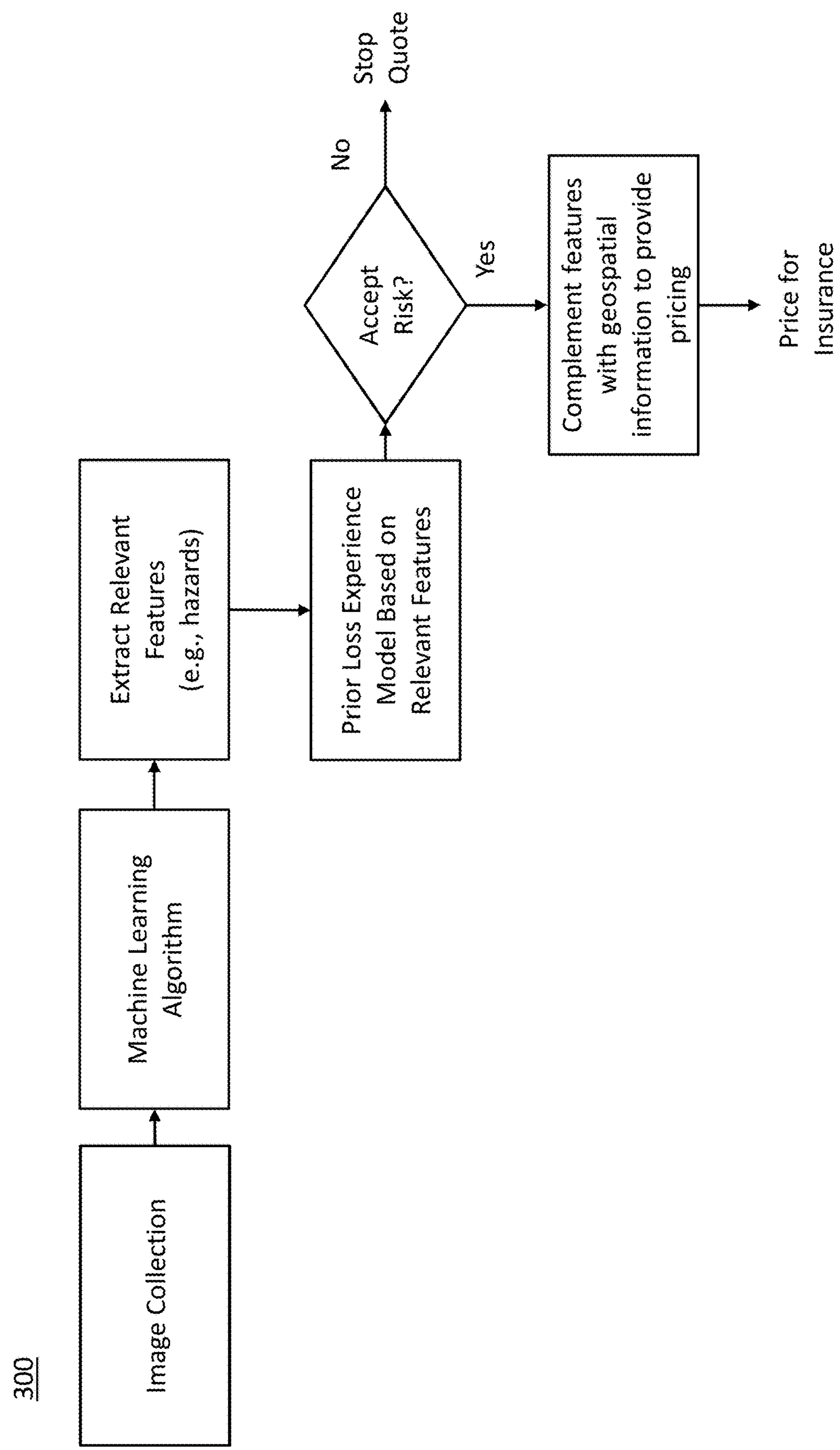
Figure 4A:
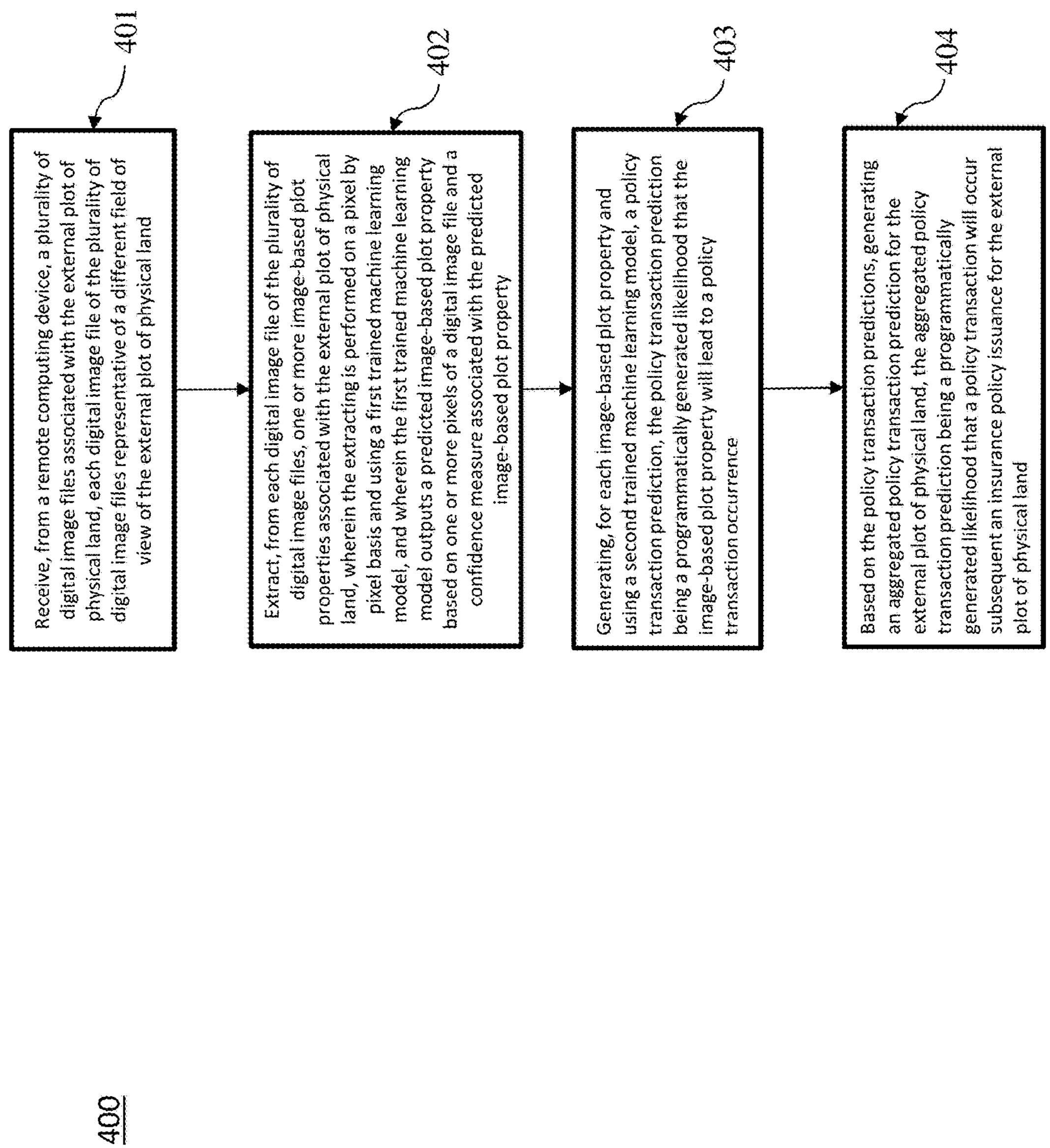
Figure 4B:
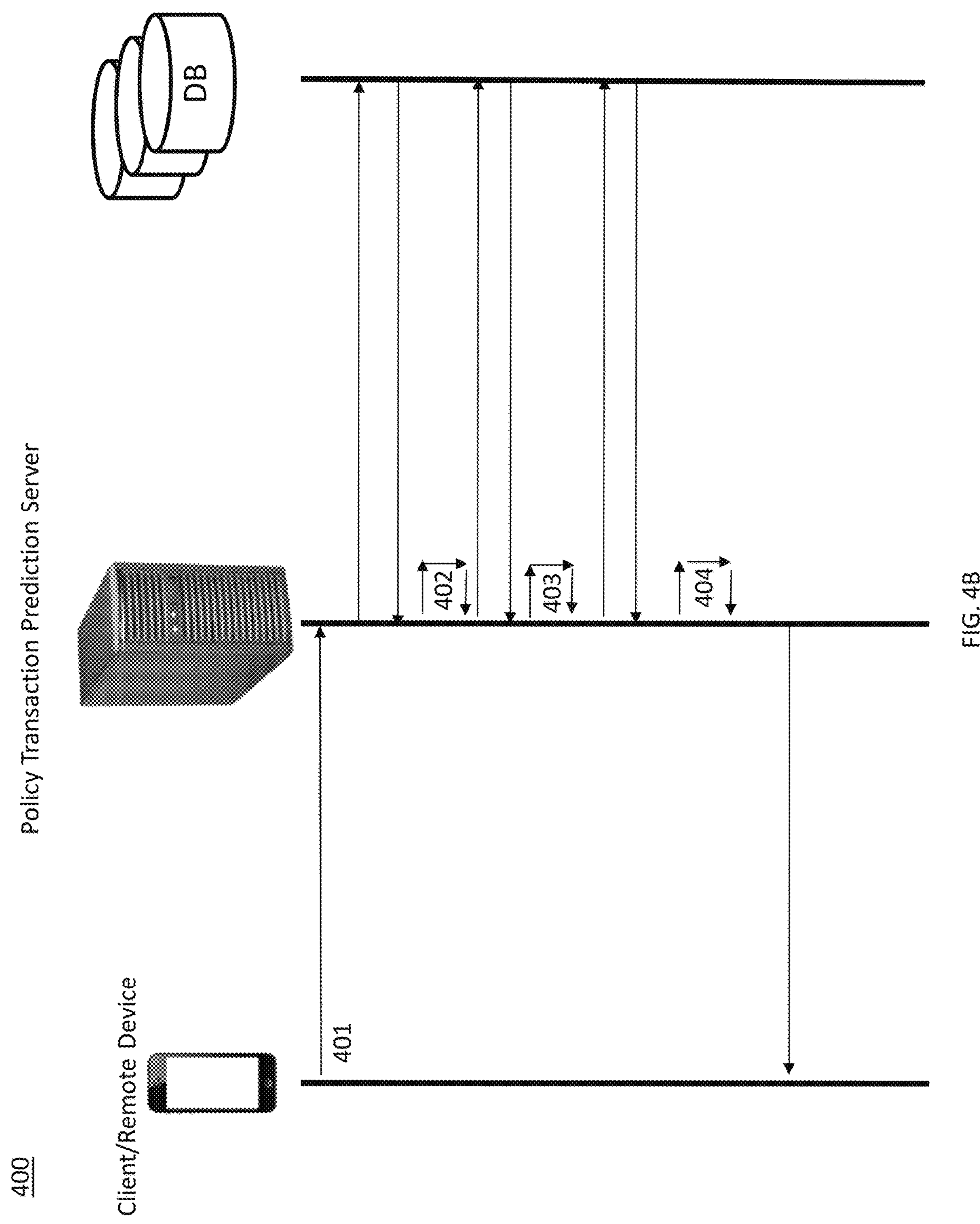

Having thus described the disclosure in general terms, reference will now be made to the accompanying drawings, which are not necessarily drawn to scale, and wherein:

FIG. 1 is a system architecture diagram of system configured to practice embodiments of the present disclosure;

FIG. 2 is an exemplary schematic diagram of a computing entity according to one embodiment of the present disclosure;

FIG. 3 is a flow chart of an exemplary process for plot risk selection and pricing for use with embodiments of the present disclosure;

FIG. 4A illustrates an exemplary process for predicting policy transaction behavior for use with embodiments of the present disclosure; and FIG. 4B illustrates an exemplary process for predicting policy transaction behavior for use with embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Brief Overview

Various embodiments of the disclosure generally relate to a prediction system that supports providing policies for external plots. Each of the external plots can have one or more structures thereon, and one or more hazards associated therewith.

The methods, apparatus and computer program products described herein are operable to predict a likelihood that a policy transaction (e.g., termination, loss) will occur in a future network time period. The prediction is based on a machine learning model, which may use the following: learned relationships within digital image files representing an external plot (between individual pixels and groups of pixels), plot hazard score (determined by a count and severity of identified hazards), and an underwriting decision. The prediction may also be used to determine whether additional inspection of a plot is necessary.

The methods, apparatus and computer program products described herein are further operable to predict a likelihood that a hazardous label will occur in a digital image file associated with a plot in a future network time period. The prediction is based on a machine learning model using learned relationships within digital image files representing an external plot (between individual pixels and groups of pixels). The prediction may also be used to determine whether properties of a plot meet eligibility criteria without the need for an in-person inspection.

Visually extracting image-based plot properties from digital image files is tedious and time-intensive. Also, making individual assessments of plots based upon the plot's properties can be fraught with mistakes and be data intensive. The inventors have identified that the system resources and time allocated to such evaluations are easily exhausted and compromised as a result of these challenges. The inventors have determined that the ability to programmatically normalize digital image files, extract plot properties from them, and predict policy transactions would reduce the computing resources and time necessary to perform plot evaluations. The inventors have further determined that accuracy of predicted policy transactions is improved as a result of the presently disclosed embodiments, resulting in a reduction of computing resources and time necessary to support unnecessarily granted policies.

Exemplary Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" or "computing device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The terms "external plot," "plot," or "external plot of physical land" refer to a plot of land or any structure that is under review for insurance policy eligibility, risk, and pricing. For example, an external plot may be a farm with a house, a barn, a swimming pool, and one or more trees. In embodiments, an external plot of physical land is associated with an external plot of physical land identifier. In embodiments, the external plot of physical land identifier is one or more items of data by which an external plot of physical land may be identified. For example, an external plot of physical land identifier may comprise ASCII text, a pointer, a memory address, and the like. In embodiments, each external plot of land may have a feature vector or other data structure containing feature data, metadata, or policy property data associated therewith.

The term "structure" refers to any constructed structure present on an external plot of physical land. In embodiments, a structure is associated with a structure identifier. In embodiments, a structure identifier is one or more items of data by which a structure may be identified. For example, a structure identifier may comprise ASCII text, a pointer, a memory address, and the like.

The term "digital image file" refers to a file containing image data. Example of digital image files include .jpg, .jpeg, .png, and the like. In embodiments, a digital image file is associated with a digital image file identifier. In embodiments, a digital image file identifier is one or more items of data by which a digital image file may be identified. For example, digital image file identifier may comprise ASCII text, a pointer, a memory address, and the like. In embodiments, each digital image file may have a feature vector or other data structure containing feature data or other metadata associated therewith.

The term "field of view" refers to an extent of observability of an external plot of physical land provided by a digital image file. Digital image files herein may be aerial, satellite, street, and external photos, having associated fields of view. In embodiments, a field of view may be associated with a field of view type or identifier.

The term "policy" refers to a contractual agreement for liability or insurance coverage for an external plot of physical land and/or structures thereon.

The term "policy identifier" refers to one or more items of data by which a policy may be identified. For example, a policy identifier may comprise ASCII text, a pointer, a memory address, and the like.

The term "policy data structure" refers to a data structure comprising data records associated with a policy and an external plot of physical land. In embodiments, a policy data structure may comprise a record containing a policy identifier and an external plot of physical land identifier.

The term "policy transaction" refers to any transaction occurring related to a policy. Examples of transaction can be a policy termination, a policy lapse, a policy creation, and the like. In embodiments, a policy transaction may be associated with a policy transaction identifier. In embodiments, a policy transaction identifier is one or more items of data by which a policy transaction may be identified. For example, policy transaction identifier may comprise ASCII text, a pointer, a memory address, and the like.

The term "policy transaction behavior" refers to interaction between a client and a policy, whereby the client influences the policy transaction through their electronic behavior.

The term "policy transaction prediction" refers to a programmatically generated likelihood that a policy transaction will occur based on the presence of a particular plot property associated with an external plot of physical land. In embodiments, the policy transaction prediction is generated using a trained machine learning model.

The terms "plot properties" or "plot property" refer to any property or properties associated with an external plot. Examples of plot properties include previous policy cancellations, known hazards on the plot, and the like. Examples are further expanded on below. In embodiments, a plot property is associated with a plot property identifier. In embodiments, a plot property identifier is one or more items of data by which a plot property may be identified. For example, a plot property identifier may comprise ASCII text, a pointer, a memory address, and the like.

The terms "image-based plot properties" or "image-based plot property" refer to any property or properties associated with an external plot that are derived through extracting information from digital image files. Examples of image-based plot properties include a tree overhang on a roof, presence of solar panels on a roof, presence of skylight windows on a roof, presence of unnatural objects on a roof top, roof material, roof surface, roof pitch, detached structures on the external plot of physical land, presence of a pool on the external plot of physical land, a pool shape, presence of barriers around insured property and between adjacent properties, distance to brush and trees, buffer between house or structure and surrounding vegetation, presence of ADT, presence of a "Beware Of Dog" sign, presence of a "Do Not Trespass" sign, cracks in a driveway, peeling paint from a structure, or signs of rust on a dwelling and the like. Examples are further expanded below. In embodiments, an image-based plot property is associated with an image-based plot property identifier. In embodiments, an image-based plot property identifier is one or more items of data by which an image-based plot property may be identified. For example, an image-based plot property identifier may comprise ASCII text, a pointer, a memory address, and the like.

The term "predicted image-based plot property" refers to a predicted classification assigned to a group of pixels contained within one or more digital image files. In embodiments, the predicted classification is generated using a trained machine learning model and extracted pixels from a plurality of digital image files associated with an external plot of physical land. In embodiments, a predicted image-based plot property has associated therewith a confidence measure representative of a likelihood that the predicted image-based plot property is an actual/correct image-based plot property present in the one or more digital image files.

The term "currency value" refers to a digital amount of currency assigned to a policy. The currency value may be related to a replacement cost associated with the external plot of physical land and structures thereon or associated therewith.

The term "risk value" refers to a digital level of risk assigned to a policy. For example, a policy might be considered "high risk" if there is a prediction that a policy transaction (e.g., termination) will occur in the near future or if there are several known hazards on the property.

The term "hazard score" refers to a score assigned to an external plot based on a number of identified hazards on the external plot and a severity measure associated with each hazard.

The term "underwriting status" refers to whether there is a policy currently in force associated with a particular external plot. An underwriting status may be one of in force or canceled.

The term "aggregated policy transaction prediction" refers to a programmatically generated likelihood that a policy transaction will occur subsequent an insurance policy issuance for an external plot of physical land. In embodiments, an aggregated policy transaction prediction is generated based upon a combination of policy transaction predictions associated with plot properties associated with the external plot of physical land. In embodiments, different plot properties are assigned different weights in order to generate the aggregate policy transaction prediction.

Machine learning is a subfield of computer science that gives computers the ability to learn without being explicitly programmed. Evolved from the study of pattern recognition and computational learning theory in artificial intelligence, machine learning explores the study and construction of algorithms that can learn from and make predictions on data. Such algorithms overcome following strictly static program instructions by making data-driven predictions or decisions through building a machine learning model from sample inputs. Machine learning is employed in a range of computing tasks where designing and programming explicit algorithms with good performance is difficult or infeasible.

Machine learning enables prediction-making through the use of computers. Machine learning can be unsupervised for exploratory data analysis. Machine learning can also be unsupervised and be used to learn and establish baseline behavioral profiles for various entities and then used to find meaningful anomalies.

Machine learning is used to devise complex models and algorithms that lend themselves to prediction; also known as predictive analytics. These machine learning models allow researchers, data scientists, engineers, and analysts to produce reliable, repeatable decisions and results, and uncover hidden insights through learning from historical relationships and trends in the data.

The term "machine learning model" refers to a machine learning task. A machine learning model typically comprises a title and encompasses one or more target variables.

The term "target variable" refers to a value that a machine learning model is designed to predict. In the present embodiments, historical data is used to train a machine learning model to predict the target variable. Historical observations of the target variable are used for such training.

The term "machine learning model identifier" refers to one or more items of data by which a machine learning model may be identified. For example, a machine learning model identifier may comprise ASCII text, a pointer, a memory address, and the like. In embodiments, a first machine learning model may be associated with a first machine learning model identifier and a second machine learning model may be associated with a second machine learning model identifier, and the like.

It should be appreciated that the terms "programmatically expected," "infer," "inferred," or "inference" indicate machine prediction of occurrence of certain events. For example, a "programmatically expected" or "programmatically generated" likelihood is a value or number determined by machine prediction specifying whether a policy transaction will occur in a future network period.

The term "likelihood" refers to a measure of probability for occurrence of a particular event. For example, the likelihood that a policy transaction will occur may be a value associated with a specific scale. In some implementations, the machine predictions discussed above are based, at least in part, on the "likelihood" that an event will occur.

Example System Architecture

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present disclosure may operate. Client devices may access a policy transaction prediction system 115 via a communications network 102 (e.g., the Internet, LAN, WAN, or the like) using client devices 101A-101N. The policy transaction prediction system 115 may comprise a server 107 in communication with one or more databases or repositories 108, 109, 110.

The server 107 may be embodied as a computer or computers as known in the art. The server 107 may provide for receiving of electronic data from various sources, including but not necessarily limited to the client devices 101A-101N. For example, the server 107 may be operable to receive and process search requests provided by the client devices 101A-101N. The server 107 may facilitate the generation and providing of various search results comprising digital content items. The server 107 may include a prediction module 103 for predicting transaction behavior and an image processing module 104 for processing received digital image files.

The databases or repositories 108-110 may be embodied as a data storage device such as a Network Attached Storage (NAS) device or devices, or as a separate database server or servers. The databases 108-110 include information accessed and stored by the server 107 to facilitate the operations of the policy transaction prediction system 115. For example, the databases 108-110 may include, without limitation, plot information, plot properties, and image based plot properties, and/or the like.

Plot repository 109 may include a plot profile for each plot of the policy transaction prediction system 115. The plot profile includes identifying information about a plot of land, including a geographic location in the form of GPS coordinates and other attributes. A plot profile may be created upon registration with the policy transaction prediction system 115.

Plot property repository 110 may include a plurality of data structures representing properties associated with a plot. Properties associated with a plot can include examples listed below.

Image-based plot property repository 108 may include digital image files uploaded to the policy transaction prediction system 115 from client devices 101A-101N as well as properties extracted and coded from the digital image files as described herein.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute one or more "apps" to interact with the policy transaction prediction system 115. Such apps are typically designed to execute on mobile devices, such as tablets or smartphones. For example, an app may be provided that executes on mobile device operating systems such as iOS®, Android®, or Windows®. These platforms provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the policy transaction prediction system 115 via a web browser. As yet another example, the client device 101A-101N may include various hardware or firmware designed to interface with the policy transaction prediction system 115.

Via an interaction method described above, the client device 101A-101N may upload digital image files to the policy transaction prediction system 115.

An example of a data flow for exchanging electronic information among one or more client devices 101A-101N and the policy transaction prediction system 115 is described below.

In the depicted embodiment, the one or more client devices 101A-101N are configured to transmit digital image files and other data to the policy transaction prediction system 115. The digital image files and other data are transmitted by wired or wireless communication over the communications network 102 to the policy transaction prediction system 115. The one or more client devices 101A-101N may receive communication over the communications network 102 from the policy transaction prediction system, and the communication may be transmitted by wired or wireless communication.

Example Apparatus for Implementing Embodiments of the Present Disclosure

The server 107 may be embodied by one or more computing systems, such as apparatus 200 shown in FIG. 2. The apparatus 200 may include a processor 202, a memory 201, input/output circuitry 204, communications circuitry 205, image processing circuitry 203, and prediction circuitry 206. The apparatus 200 may be configured to execute the operations described herein. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus should therefore be understood to include particular hardware configured to perform the functions associated with the particular circuitry as described herein. That is, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Image processing circuitry 203 includes hardware configured to receive and process digital image files. The image processing circuitry 203 may utilize processing circuitry, such as the processor 202, to perform these actions. The image processing circuitry 203 may send and/or receive data from prediction circuitry 206. In some implementations, the sent and/or received data may be data identifying image-based plot properties associated with one or more external plots. It should also be appreciated that, in some embodiments, the image processing circuitry 203 may include a separate processor, specially configured field programmable gate array (FPGA), or application specific interface circuit (ASIC). In some implementations, prediction circuitry 206, described below, may be sub-circuitry belonging to image processing circuitry 203. The image processing circuitry 203 may be implemented using hardware components of the apparatus configured by either hardware or software for implementing the functions described herein.

Prediction circuitry 206 includes hardware configured to predict that a policy transaction will occur in a future network period. In some implementations, the prediction is specified as a probability or likelihood that the policy transaction will be a termination in the future network period and/or identify hazards or variables in digital image files. The prediction circuitry 206 may utilize processing circuitry, such as the processor 202, to perform these actions. However, it should also be appreciated that, in some embodiments, the prediction circuitry may include a separate processor, specially configured FPGA, or ASIC for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Policy Transaction Behavior Prediction

As described, a policy providing service may utilize available data to provide policy requesters with available policies related to external plots, including risk assessment and pricing related to the policy and external plot.

In order to accurately gauge risk associated with providing a policy related to a particular external plot, a policy provider must gather several types of data about the external plot. This aids in programmatic decision-making as to whether to provide the policy and what to charge for the policy. As an example, a policy associated with a particular plot may be considered high risk and therefore the policy provider will opt not to grant a policy for the plot. Or, the policy provider may provide the policy at a greater cost than if the policy were to be considered low risk.

Naturally, the ability to accurately predict policy transaction behavior impacts resource availability and efficient use thereof. Accordingly, there exists a dire market need for methods and systems that can accurately predict policy transactions (e.g., terminations) that will occur associated with a particular external plot.

In the present embodiments, a plurality of machine learning models are employed to provide aggregated policy transaction predictions. The machine learning models are trained using various types of data.

For example, digital image files are collected through home inspections (through the use of digital image capturing means such as a computing device having a digital camera installed thereon) as well as received electronically over a network. For example, a certain number of homes that bind an insurance policy will be inspected by a third party vendor each year. This inspection consists of digital imagery collected of the property as well as a checklist of hazards to identify. These inspections result in the capture of a set of images of a property, as well as a list of hazards found at a property.

Further, publicly licensed digital images of common outdoor items are available for use. For example, trees, windows, roofs, and the like, are represented in a large plurality of digital image files. These publicly licensed digital image files supplement the training of the model that is done using the inspection-related images so that some data is guaranteed to be clean and separated from the above training data.

In embodiments, classes of data are identified/used for training the machine learning model. Examples of classes that are identified include overhanging branches, missing and/or rusted gutters, broken windows, cracked foundations, broken stairs, cracked or broken chimney, cracked or peeling exterior paint, cracks or holes in the soffits, presence of a pool, presence of a fence, "ADT" signs, roof characteristics, and finally "poor maintenance". As can be imagined, some of these categories are broad and/or not specific. These are also subject to inspector bias, therefore the present embodiments are flexible accordingly.

In embodiments, a deep learning convolutional neural network serves as a top layer of machine learning for the present disclosure. In embodiments, a tree based machine learning model is used for the bottom and prediction layer.

In embodiments, the deep learning model is a convolutional neural network for image recognition style problems. In embodiments, a deep learning model has 50 layers of learning. In embodiments, the deep learning model examines a digital image on a pixel level, and look at both individual pixels and relation of groups of pixels to another.

In embodiments, the deep learning model provides a set of predictions of what is in the image and where everything is in relation to one another. In embodiments, the deep learning model systematically moves a sliding window over the image, providing predictions for all items in the window provided.

In embodiments, given an arbitrary number of images, the deep learning model model will describe all of them. This fact is important, as the number of images associated with a given inspection is not known prior to being fed into the model. The model will append all of the predictions into a string of numbers, which are fed into the next (i.e., tree based) model.

In embodiments, the tree based machine learning model will, given a description of a set of digital images (e.g., from the first deep learning machine learning model), provide a prediction of whether a hazard class exists in any of the images.

In embodiments, the tree based machine learning model evaluates the description of the set of images on an aggregate basis. In embodiments, the tree based machine learning model reviews the predicted locations of objects/properties in relation to one another across an entire set of images associated with an external plot of physical land. In so doing, the machine learning model is provided with context to work around any depth perception issues, as well as provide robustness to arbitrary numbers of images.

In embodiments, the tree based machine learning model also receives additional data associated with the digital images, such as policy related information. For example, digital images associated with an external plot of land are received from a policy holder. As such, those digital images can be associated with any policy or policy related information associated with the policy holder. The policy related information can be used for predicting policy transaction behavior.

In embodiments, policy related and/or external plot of land information (e.g., features of feature vectors associated therewith) can include one or more of coverage per square foot, days between policy purchase and effective date, number of adults on the policy, age of the insured on the policy, count of prior losses, and existence of prior insurance.

FIG. 3 is a flow chart of an example process 300 for plot risk selection and pricing or other determination for use with embodiments of the present disclosure. In some embodiments, images are collected and processed before being input into a machine learning model. Relevant features associated with an external plot and potential new policy are extracted from the model and examined against a prior loss experience model. If a level of risk produced by the prior loss experience model is not acceptable, a quote for the potential policy is stopped. If the level of risk produced by the prior loss experience model is determined to be acceptable, the relevant features are complemented with geospatial information so that a determination about the policy can be made, for example a price for the policy can be provided.

FIGS. 4A-4B illustrate an exemplary process 400 for predicting policy transaction behavior for use with embodiments of the present disclosure. The process 400 begins with receiving 401 from a remote computing device, a plurality of digital image files associated with an external plot of physical land. In embodiments, each digital image file of the plurality of digital image files is representative of a different field of view of the external plot of physical land.

In embodiments, the process 400 continues with extracting 402, from each digital image file of the plurality of digital image files, one or more image-based plot properties associated with the external plot of physical land. In embodiments, the extracting is performed on a pixel by pixel basis and using a first trained machine learning model. In embodiments, the first trained machine learning model outputs a predicted image-based plot property based on one or more pixels of a digital image file and a confidence measure associated with the predicted image-based plot property.

In embodiments, the process 400 continues with generating 403, for each image-based plot property and using a second trained machine learning model, a policy transaction prediction, the policy transaction prediction being a programmatically generated likelihood that the image-based plot property will lead to a policy transaction occurrence.

In embodiments, a hazard score for the external plot of physical land is generated by the second machine learning model. In embodiments, the policy transaction prediction is based at least on the hazard score.

In embodiments, the hazard score is generated based at least on a count of the hazardous image-based plot properties and a severity of each of the one or more hazardous image-based plot properties.

In embodiments, the process 400 continues with, based on the policy transaction predictions, generating 404 an aggregated policy transaction prediction for the external plot of physical land, the aggregated policy transaction prediction being a programmatically generated likelihood that a policy transaction will occur subsequent an insurance policy issuance for the external plot of physical land. In embodiments, the aggregated policy transaction prediction is based on a plurality of policy transaction predictions associated with the external plot of physical land.

In embodiments, the process comprises generating the aggregated policy transaction prediction for the external plot of physical land prior to an issuance of an insurance policy for the external plot of physical land.

In some embodiments, if a policy provider accepts a level of risk of predicted policy transaction behavior, the provider may complement features with geospatial information to provide pricing for a policy.

In embodiments, the policy transaction is a policy termination.

In embodiments, the policy termination is initiated by an entity issuing the insurance policy for the external plot of physical land.

In embodiments, the external plot of physical land includes one or more structures.

In embodiments, each digital image file of the plurality of digital image files is normalized.

In embodiments, the process comprises assigning a price value to an insurance policy for the external plot of physical land based at least on the aggregated policy transaction prediction.

In embodiments, the process comprises assigning a risk value to an insurance policy for the external plot of physical land based at least on the aggregated policy transaction prediction.

In embodiments, an image-based plot property of the plurality of plot properties is one of a tree overhang on a roof, presence of solar panels on a roof, presence of skylight windows on a roof, presence of unnatural objects on a roof top, roof material, roof surface, roof pitch, detached structures on the external plot of physical land, presence of a pool on the external plot of physical land, a pool shape, presence of barriers around insured property and between adjacent properties, distance to brush and trees, buffer between house or structure and surrounding vegetation, presence of ADT, presence of a "Beware Of Dog" sign, presence of a "Do Not Trespass" sign, cracks in a driveway, peeling paint from a structure, or signs of rust on a dwelling.

In embodiments, the process comprises determining that one or more of the image-based plot properties represents one or more hazardous image-based plot properties, assigning a severity to each hazardous image-based plot property of the one or more hazardous image-based plot properties, and returning an indication of each of the one or more hazardous image-based plot properties.

In embodiments, the process comprises receiving an underwriting status and input the underwriting status into the second machine learning model.

In embodiments, the first machine learning model is a convolutional neural network.

In embodiments, the first machine learning model is trained using images of known plot properties.

In embodiments, the first machine learning model provides image-based plot properties based upon any arbitrary number of received digital image files.

In embodiments, the second machine learning model is a tree based machine learning model.

In embodiments, the second machine learning model is trained using known plot properties and known image-based plot properties.

In embodiments, the second machine learning model predicts whether a hazard exists in any of the image-based plot properties.

In embodiments, the second machine learning model uses the existence of a hazard to provide a policy transaction prediction.

Example Image-Based Plot Properties and Prediction Processes

It should be understood that each of the plot properties and image-based plot properties discussed in this application, may be in some embodiments, be primary or secondary properties. A list of exemplary properties is provided below.

Table A shows example plot properties and image-based plot properties.

TABLE A

| Property | Features |
|---|---|
| Roof Related | Tree overhang on roof, presence of solar panels on roof, presence of skylight windows on roof, presence of unnatural objects on roof top, roof material, shape/facets of roof, slope/pitch of roof, use of multiple material types/colors on roof |
| Plot Related | Detached structures on plot (count/type), presence of pool, shape of pool, condition of pool, barriers to pool, presence of barriers around insured property and between adjacent properties (e.g., fences), distance to brush and trees, info on buffer between house and surrounding vegetation, and/or the like. |
| Customer Related | Presence of security system, Beware of Dog, Do Not Trespass signs, cracks in driveway, peeling paint, signs of rust on dwelling, upkeep, and/or the like. |

Examples of properties that may be associated with a plot or structure also include:

Information/data regarding the building materials used to build the structure, finishings (e.g., toilets, vanities, cabinets, wallpaper, paint, flooring, lighting fixtures, etc.) used to finish one or more spaces within the structure, furnishings (e.g., couches, tables, chairs, desks, beds, bookshelves, window dressings, etc.) used to furnish the structure, appliances and structure systems (e.g., HVAC system, hot water heater, security system, refrigerator, stove, microwave, dishwasher, clothes washer and dryer) housed within and/or servicing the structure, electronic devices (e.g., televisions, computers, smart building devices, gaming systems, etc.), personal effects (e.g., clothes, jewelry, toiletries, purses, shoes, linens, etc.) and other items used to build, finish, or furnish the structure and/or housed within the structure may be stored associated with the plot. For example, the information/data regarding incident information/data corresponding to one or more incidents involving the structure or plot (e.g., tree limb falling on roof, slip and fall on the front steps, and/or the like); and/or other information/data corresponding to the property may be stored associated with the plot.

In some implementations, hazardous image-based plot properties can include tree branch overhang on roof, the presence of a pool, missing/unstable/broken steps, and the presence or lack of fences.

In some implementations, one property may represent category data, specifically residential plots. To determine a normalized value of the one property, an algorithm may be executed on associated raw data related to an external plot. For example, if the category data associated with an external plot is "residential," the value of the property is 1. If the category data associated with the external plot is not "residential," the value of the property is 0.

In some embodiments, a number of example properties relate to category data and sub-category data. There is also a number of properties related to location data.

Similar properties may be clustered, grouped, or aggregated. The clustered or the non-clustered properties may be used to train a machine learning model. It should be understood that the selection of properties or clusters of attributes for training machine learning models or for policy transaction prediction processes can greatly affect the respective performance. In some implementations, properties and/or clusters of properties are selected based on statistical analysis.

Details regarding various embodiments are described in the attached appendices, the contents of which are hereby herein incorporated by reference in their entirety.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for predicting policy transaction behavior, the apparatus comprising at least one processor and at least one memory including computer program code, the at least one memory and the computer program code configured to, with the at least one processor, cause the apparatus to:

receive, originating from a remote computing device, a plurality of digital image files associated with an external plot of physical land, each digital image file of the plurality of digital image files representative of a different field of view of the external plot of physical land;

extract, from each digital image file of the plurality of digital image files and using a first trained machine learning model, one or more predicted image-based plot properties associated with the external plot of physical land, wherein the extracting is performed on a pixel by pixel basis, and wherein the first trained machine learning model outputs a predicted image-based plot property based at least in part on one or more pixels of a digital image file and a confidence measure associated with the predicted image-based plot property;

generate, for each predicted image-based plot property and using a second trained machine learning model, a policy transaction prediction, the policy transaction prediction being a programmatically generated likelihood that the image-based plot property will lead to a policy transaction occurrence;

based at least in part on the policy transaction predictions, generate an aggregated policy transaction prediction for the external plot of physical land, the aggregated policy transaction prediction being a programmatically generated likelihood that a policy transaction will occur subsequent to an insurance policy issuance for the external plot of physical land, wherein the policy transaction is a policy termination; and transmit, to a requesting computing device, the aggregated policy transaction prediction.

2. The apparatus of claim 1, further configured to generate the aggregated policy transaction prediction for the external plot of physical land prior to an issuance of an insurance policy for the external plot of physical land.

3. The apparatus of claim 1, wherein the policy termination is initiated by an entity issuing the insurance policy for the external plot of physical land.

4. The apparatus of claim 1, wherein the external plot of physical land includes one or more structures.

5. The apparatus of claim 1, wherein the apparatus is further caused to assign a price value to an insurance policy for the external plot of physical land based at least in part on the aggregated policy transaction prediction.

6. The apparatus of claim 1, wherein the apparatus is further caused to assign a risk value to an insurance policy for the external plot of physical land based at least in part on the aggregated policy transaction prediction.

7. The apparatus of claim 1, wherein an image-based plot property of the plurality of plot properties is one of a tree overhang on a roof, presence of solar panels on a roof, presence of skylight windows on a roof, presence of unnatural objects on a roof top, roof material, roof surface, roof pitch, detached structures on the external plot of physical land, presence of a pool on the external plot of physical land, a pool shape, presence of barriers around insured property and between adjacent properties, distance to brush and trees, buffer between house or structure and surrounding vegetation, presence of ADT, presence of a "Beware Of Dog" sign, presence of a "Do Not Trespass" sign, cracks in a driveway, peeling paint from a structure, or signs of rust on a dwelling.

8. The apparatus of claim 1, wherein the apparatus is further caused to:

determine that one or more of the image-based plot properties represents one or more hazardous image-based plot properties;

assign a severity to each hazardous image-based plot property of the one or more hazardous image-based plot properties; and return an indication of each of the one or more hazardous image-based plot properties.

9. The apparatus of claim 8, wherein the apparatus is further caused to:

generate a hazard score for the external plot of physical land; and use the generated hazard score for generating one or more policy transaction predictions.

10. The apparatus of claim 9, wherein the hazard score is generated based at least in part on a count of the hazardous image-based plot properties and a severity of each of the one or more hazardous image-based plot properties.

11. The apparatus of claim 1, wherein the apparatus is further caused to:

receive an underwriting status and input the underwriting status into the second machine learning model.

12. The apparatus of claim 1, wherein the first machine learning model is a convolutional neural network.

13. The apparatus of claim 12, wherein the first machine learning model is trained using digital images of known plot properties.

14. The apparatus of claim 13, wherein the first machine learning model provides image-based plot properties based at least in part on any arbitrary number of received digital image files.

15. The apparatus of claim 1, wherein the second machine learning model is a tree based machine learning model.

16. The apparatus of claim 15, wherein the second machine learning model is trained using known plot properties and known image-based plot properties.

17. The apparatus of claim 16, wherein the second machine learning model generates a programmatically generated prediction representing a likelihood that a hazard exists in any of the image-based plot properties.

18. The apparatus of claim 17, wherein the second machine learning model uses the existence or lack of a hazard to programmatically generate a policy transaction prediction.

19. A computer-implemented method for predicting policy transaction behavior, the method comprising:

receiving, using a processor and originating from a remote computing device, a plurality of digital image files associated with an external plot of physical land, each digital image file of the plurality of digital image files representative of a different field of view of the external plot of physical land;

extracting, using the processor and a first trained machine learning model, from each digital image file of the plurality of digital image files, one or more predicted image-based plot properties associated with the external plot of physical land, wherein the extracting is performed on a pixel by pixel basis, and wherein the first trained machine learning model outputs a predicted image-based plot property based at least in part on one or more pixels of a digital image file and a confidence measure associated with the predicted image-based plot property;

generating, using the processor and a second trained machine learning model, for each predicted image-based plot property, a policy transaction prediction, the policy transaction prediction being a programmatically generated likelihood that the predicted image-based plot property will lead to a policy transaction occurrence;

based at least in part on the policy transaction predictions, generating, using the processor, an aggregated policy transaction prediction for the external plot of physical land, the aggregated policy transaction prediction being a programmatically generated likelihood that a policy transaction will occur subsequent to an insurance policy issuance for the external plot of physical land, wherein the policy transaction is a policy termination; and transmitting, using the processor and to a requesting computing device, the aggregated policy transaction prediction.

* * * * *

UNITED STATES PATENT AND TRADEMARK OFFICE

CERTIFICATE OF CORRECTION

PATENT NO. : 10,997,667 B2
APPLICATION NO. : 16/125347
DATED : May 4, 2021
INVENTOR(S) : Kim et al.

It is certified that error appears in the above-identified patent and that said Letters Patent is hereby corrected as shown below:

On the Title Page

Item [72], delete:
"Sung Hoon Kim, Boston, MA (US);
Shweta Gadgil, Cambridge, MA (US);
Joshua Harvey, Cambridge, MA (US);
Lingge Li, Irvine, CA (US)"

And insert:
--Sung Hoon Kim, Boston, MA (US);
Shweta Gadgil, Cambridge, MA (US);
Joshua Harvey, Cambridge, MA (US);
Lingge Li, Irvine, CA (US);
Guillermo Leiva, Boston, MA (US)--

Signed and Sealed this
First Day of March, 2022

Drew Hirshfeld
*Performing the Functions and Duties of the*
*Under Secretary of Commerce for Intellectual Property and*
*Director of the United States Patent and Trademark Office*